(12) United States Patent
Makinen

(10) Patent No.: US 6,804,533 B1
(45) Date of Patent: Oct. 12, 2004

(54) RELOCATION OF COMMUNICATION SERVICES

(75) Inventor: Teemu Makinen, Jarvenpaa (FI)

(73) Assignee: Nokia Corporation, Espoo (FI)

( * ) Notice: Subject to any disclaimer, the term of this patent is extended or adjusted under 35 U.S.C. 154(b) by 148 days.

(21) Appl. No.: 10/129,342

(22) PCT Filed: Nov. 2, 2000

(86) PCT No.: PCT/EP00/10909

§ 371 (c)(1),
(2), (4) Date: Oct. 22, 2002

(87) PCT Pub. No.: WO01/33869

PCT Pub. Date: May 10, 2001

(30) Foreign Application Priority Data

Nov. 2, 1999 (GB) .............................. 9926069

(51) Int. Cl.$^7$ ................................ H04Q 7/20
(52) U.S. Cl. ................ 455/552.1; 455/436; 455/432.3; 370/352; 370/353; 370/354
(58) Field of Search .......................... 455/432.1, 432.2, 455/432.3, 436, 438, 552.1, 453, 456.1, 456.5, 440; 370/331, 352, 353, 354

(56) References Cited

U.S. PATENT DOCUMENTS

| | | | | |
|---|---|---|---|---|
| 5,664,007 | A | * | 9/1997 | Samadi et al. .............. 455/442 |
| 6,160,804 | A | * | 12/2000 | Ahmed et al. ............... 370/349 |
| 6,201,962 | B1 | * | 3/2001 | Sturniolo et al. ......... 455/432.2 |
| 6,577,607 | B1 | * | 6/2003 | Mitts et al. ............... 370/310.1 |
| 6,650,908 | B1 | * | 11/2003 | Coombes et al. ........... 455/560 |
| 6,675,014 | B1 | * | 1/2004 | Sundquist ................ 455/435.1 |
| 6,718,173 | B1 | * | 4/2004 | Somani et al. ........... 455/456.1 |
| 2001/0036829 | A1 | * | 11/2001 | Costa et al. ................ 455/436 |

FOREIGN PATENT DOCUMENTS

| WO | WO 95/28063 | * 10/1995 |
|---|---|---|
| WO | 9837721 | 8/1998 |
| WO | 9917579 | 4/1999 |

* cited by examiner

*Primary Examiner*—Nay Maung
*Assistant Examiner*—Edan Orgad
(74) *Attorney, Agent, or Firm*—Ware, Fressola, Van Der Sluys & Adolphson LLP

(57) ABSTRACT

The present invention relates to a method, a communications system and a network element for providing communication services for a mobile station. The mobile station is arranged to use at least two different communication services provides by the communications system. The communications system comprises a first network element and a second network element for controlling the communication services provided for the mobile station. The mobile station may communicate by using at least two different communication services under the control of the first network element. The method comprises initiating relocation of the control of a least one of said communication services from the first network element to the second network element, whereafter a message is sent to the first network element. The message includes information based on which it is possible to selectively relocate said at least one communication service to the second network element. Said at least one communication service is then selectively relocated from the first network element to the second network element based on the information.

17 Claims, 3 Drawing Sheets

RELOCATION OF COMMUNICATION SERVICES

CROSS-REFERENCE TO RELATED APPLICATIONS

Priority is claimed from International Application PCT/EP00/10909 filed 2 Nov. 2000, which in turn claims priority from Great Britain application GB9926069.7, filed 3 Nov. 1999.

FIELD OF THE INVENTION

The present invention relates to relocation of communication services in a communication system and in particular, but not exclusively, to relocation of one or more communication services from a network element of a cellular communication system, the element being arranged to provide control of at least two different communication services provided for a mobile station.

BACKGROUND OF THE INVENTION

Communication networks typically operate in accordance with a given standard which sets out what the various elements of the network are permitted to do and how that should be achieved. The given standard also defines the types of connections by means of which the communication service is provided for a subscriber of the communication network. For example, the standard defines whether the subscriber or more precisely, a subscriber terminal is provided with a circuit switched service or a packet switched service for communication, and also the manner how the circuit switched or the packet switched service is to be implemented. Thus the various standards define several different "rules" for communication. The rules are often referred to as protocols. The protocols may be used for controlling various events and functionalities in a connection provided through the communications network. Several protocols may be simultaneously in an active state for providing control of a connection.

A subscriber terminal that is to be used for communication over the given communication network has to be implemented in accordance with the standard. A subscriber terminal may also be arranged to be compatible with more than one standard, i.e. the terminal may use several different types of services for communication. It is also possible to have several communication connections based on different standards at the same time. For example, a terminal may simultaneously communicate in parallel through a circuit switched (CS) connection and a packet switched (PS) connection.

A communication network is a cellular radio network consisting of cells. In most cases the cell can be defined as a certain area covered by one or several base transceiver stations (BTS) serving mobile stations (MS) or similar user equipment (UE) via a radio interface and possibly connected to a base station subsystem (BSS). Several cells cover a larger area, and form typically a radio coverage area referred to as a location area (LA) or in some standards as a routing area (RA). It is noted that the size of the location area or routing area depends on the system and circumstances, and may equal to one cell or be even smaller, such a part of a coverage area of a base station.

A feature of the cellular system is that it provides mobility for the mobile stations, i.e. the mobile stations are enabled to move from a cell or location area to another, and even from a network to another network that is compatible with the standard the given mobile station is adapted to. Mobile stations having an active i.e. ongoing connection may also be relocated from the network apparatus of one location area to network apparatus of a new location area during an ongoing connection. This is enabled by a location management functionality that keeps record of the current locations of the mobile stations, and controls and proceeds the relocation of any ongoing connections between the mobile station and the network apparatus.

A mobile station (MS) within a location area of a communications system may be controlled and a location management functionality may be provided by a controller node. A cellular communications system also typically comprises a location register or several location registers for the location management purposes. The location area may be referred to as a servicing area of the given controller node. The location management functionality operates typically such that whenever a mobile station enters a new location or routing area, the control of the connection is "relocated" from the "old" control node servicing the "old" location area to a "new" control node servicing the new location area, and all control in the "old" node is cancelled.

For example, in a circuit switched GSM (Global System for Mobile) network the controller functionality is provided by means of a mobile switching center (MSC) and the location information of a mobile station is maintained by appropriate home location registers (HLR) and visitor location registers (VLR). In a general packet radio service (GPRS), that is an example of a packet switched cellular radio network, the service area of a GPRS may be controlled by means of a serving GPRS support node (SGSN). The SGSN corresponds substantially to the MSC of the GSM, but is implemented to provide packet switched communication services. Although the packet switched networks may have location register functionality of their own, the GPRS typically utilises the HLRs and VLRs of the GSM system. Other systems, such as the proposed CDMA (Code Division Multiple Access) or UMTS (Universal Mobile Telecommunications System) are also provided with appropriate controller and location management functionalities.

One of the more recent proposals for the control of communications services is a combined or integrated network element providing control for both the packet switched communication service and the circuit switched communication service. More precisely, a UMSC (=UMTS MSC) node has been proposed, said UMSC comprising both the MSC and the SGSN functionalities. A UMSC node is intended for providing a combined location management for the mobile stations within its location arearouting area such that the location management may be provided for both the circuit and packet switched services by a single integrated element. The proposed integrated node or element may provide the location update procedure e.g. in a MAP (Mobile Application Part) protocol based network environment. Thus the UMSC can be defined as a logical entity that originates and terminates combined MAP (Mobile Application Part) operation. The UMSC is arranged to utilise the VLR of the MSC. An integrated UMSC node typically refers to a physical node that includes the MSC/VLR and SGSN logical entities. The signalling between these entities and/or other possible internal entities is arranged to occur within the integrated node. Thus the other network elements will see the integrated node as a single entity.

However, the inventor has found that if combined location management, such as the above referred integrated UMSC node, used the location cancellation cannot separate different communication services (e.g. the packet switched (PS)

connection and the circuit switched (CS) connection) that may be provided simultaneously by means of the integrated node for the subscriber. This applies even if the circuit switched communication service and the packet switched communication service each have their own, from each other independent location update messages. The inventor has found that a problem arises especially in a situation where only one of the services (e.g. only the CS service or only the PS service) is to be relocated to a "new" location/routing area and thus to a "new" control node while the other remains in the "old" service area and should thus be controlled by the "old" node. More precisely, even though the old node receives the cancel location message, the old node does not know which one of the connections is to be relocated. A cancel location message may lead to deletion of all connections from the old integrated node or to other undesired situation in the system. The cancellation of all connections may occur, even though the situation may well be such that at least one of the connections should still be maintained in the old node despite the relocation of one or several other connections.

SUMMARY OF THE INVENTION

It is an aim of the embodiments of the present invention to address one or several of the above problems.

According to one aspect of the present invention, there is provided a method in a communications system providing communication services for a mobile station, the mobile station being arranged to use at least two different communication services provided by the communications system and the communications system comprising a first network element and a second network element for controlling the communication services provided for the mobile station, wherein the mobile station communicates by using at least two different communication services under the control of the first network element, comprising the subsequent steps of:

initiating relocation of the control of at least one of said communication services from the first network element to the second network element;

sending a message to the first network element, said message including information based on which it is possible to selectively relocate said at least one communication service to the second network element; and selectively relocating said at least one communication service from the first network element to the second network element based on the information.

The first network element may be arranged to provide circuit switched communication services and packet switched communication services for the mobile station. The first network element may also provide combined location management for the at least two communication services before the relocation is initiated, and, after said at least one communication service is relocated, the first network element may provide location management for those communication services only that were not relocated.

According to another aspect of the present invention there is provided a communications system for providing communication services for a mobile station, the communications system providing the mobile station with at least two different communication services, the communications system comprising:

a first network element for controlling the at least two communication services provided for the mobile station for communication;

means for initiating relocation of the control of at least one of said communication services from the first network element to a second network element; and means for sending a message to the first network element, said message including information based on which it is possible to selectively relocate said at least one communication service to the second network element, wherein the first network element is arranged to selectively cancel its control of the communication services based on the information.

According to another aspect of the present invention there is provided an integrated node in a communications system for providing a mobile station with at least two different communication services, comprising:

means for controlling a first communication service provided for the mobile station for communication;

means for controlling a second communication service provided for the mobile station for communication; and means for processing a message from the communication system, said message including information based on which it is possible to selectively relocate one or several of the communication services to a second network element, wherein the integrated node is arranged to selectively cancel its control of the communication services to be relocated based on the information.

The embodiments of the invention provide several advantages. One of the benefits is that it may enable selective relocation of only one or some of the ongoing communication services handled by an integrated controller entity while the remaining connection or connections may continue and a disconnection of any communication services may be avoided.

BRIEF DESCRIPTION OF DRAWINGS

For better understanding of the present invention, reference will now be made by way of example to the accompanying drawings in which:

FIG. 1 shows a schematic diagram of a cellular radio network system in which embodiments of the invention can be implemented;

DESCRIPTION OF PREFERRED EMBODIMENTS OF THE INVENTION

Figure 1:
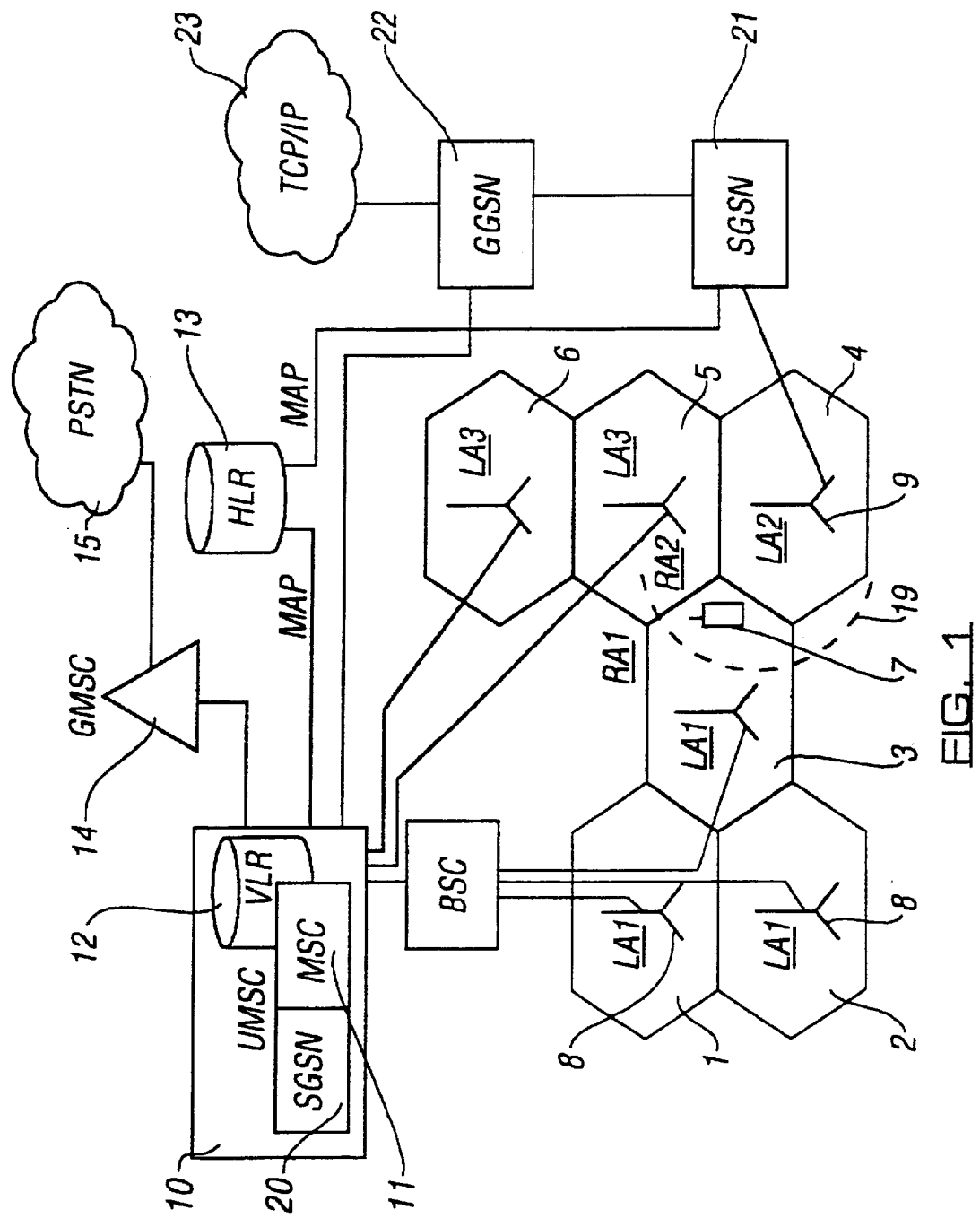
FIG. 1 shows

Reference will first be made to FIG. 1 illustrating a general view of one possible cellular communications system. It is noted that even though the exemplifying telecommunications system shown and described in more detail in the following uses the terminology of a circuit switched GSM (Global System for Mobile communications) public land mobile network (PLMN) and a packet switched UMTS (Universal Mobile Telecommunications System) services, the proposed solution can be analogously used in any system providing communication services between a transmitting station and a receiving station and a possibility to offer at least two different types of communication services for a mobile station or other corresponding user equipment.

Number of cells of the communications system are illustrated. Each of the cells 1 to 6 comprises a respective base transceiver station (BTS) 8, 9. It should be appreciated that in practise the shape of the cells deviates from the shown, e.g. because of geographical reasons and/or blocking obstacles and that the radio coverage areas of the neighbouring cells typically overlap. Each base transceiver station BTS is arranged to transmit signals to and receive signals from the mobile station (MS) 7 in the cell. Likewise, the mobile station 7 is able to transmit signals to and receive signals from the respective base transceiver station. The mobile station 7 accomplishes this via wireless communication with the base stations. Typically a number of mobile stations will be in communication with each base station although only one mobile station is shown in FIG. 1 for clarity.

Several cells are typically grouped such that one location area comprises more than one cell. For example, URA (UMTS Terrestrial Radio Access Network Registration Area) in the UMTS standard consist of a group of cells. In the example two GSM location areas LA1, LA2 and LA3 are shown, wherein LA1 comprises cells 1 to 3, LA2 comprises cell 4 and LA3 comprises cells 5 and 6. As will be explained later in more detail, the location/routing areas of the different standards may also differ geographically from each other and/or the location areas or routing areas may overlap. Therefore the GSM location areas LA1, LA2 and LA3 are not necessarily the same as what are the location or routing areas for a packet switched service, although the both services may be provided with the same network elements. The "border line" between two routing areas RA1 and RA2 of the exemplifying packet switched service is illustrated by the dashed line 19. It is noted that the RA of a packet switched service may be smaller from the size thereof than a LA of a circuit switched service or vice versa. In any case, the differently sized service areas of the different communication services may lead into situation that the in parallel used services may be controlled by separate nodes, and/or that in some situations the other one of the services should be cancelled later than the other one.

Each of the base stations 8, 9 is controlled by a respective controller entity. The communications system may include an integrated network control node, which in the example of FIG. 1 comprises UMSC (UMTS MSC) 10. The integrated node 10 provides control for both the circuit switched part and the packet switched part of the services provided for the mobile station 7. Conventionally the different services have been controlled by a separate MSC and a separate SGSN, respectively. Therefore, before explaining the operation of the integrated node 10 in more detail, the operation of a MSC and a SGSN will be briefly explained as they both were a separate entity.

In the GSM system the base stations are typically connected to a base station controller BSC or a radio network controller (RNC) that is connected further to a Mobile Switching Center (MSC). It is noted that for the reasons of clarity FIG. 1 does not show any separate MSCs in addition to the MSC functionality 11 integrated within the UMSC 10, although the system could be provided with such as well (e.g. for controlling the cell 4). As is also shown by FIG. 1, in some arrangements the base station controller BSC controlling one or several base stations between the network controller and the base stations can be omitted. The MSC may be connected to other elements or parts of the telecommunications system, such as a Public Switched Telephone Network (PSTN) 15, via a suitable linking or gateway apparatus, such as Gateway Mobile Switching Center (GMSC) 14.

In addition to the conventional circuit switched telephone services implemented by means of the GSM standard, FIG. 1 also illustrates the possibility of using a packet switched communications service, e.g. for communication with a data network 23. The illustrated GPRS (General Packet Radio. Service) may be based on the GSM technology and it may use the existing GSM base stations for its operation. The GPRS typically comprises a serving GPRS support node (SGSN) 21 corresponding substantially to the MSC of the GSM network for controlling the given location routing area and a gateway GPRS support node (GGSN) 22 for interfacing with the data network, for example the TCP/IP (Transport Control Protocol/Internet Protocol) Internet 23. In the GPRS system the network controller SGSN 21 is arranged to pass on data packets to be transmitted to the mobile station 7 by the respective base station. The controller will also receive from the base station packets of data which it has received from the mobile station.

Thus, regardless the standard, each of the network controllers controls the associated location areas, either directly or via the base station controller. It is noted that typically more than two network controllers, such as the integrated UMSC node or a separate MSC or SGSN nodes, are provided in a network.

Before explaining the operation of the integrated UMSC node 10, functionalities that are required to enable roaming of the mobile station 7 are also briefly explained. The mobile station 7 is able to move from one location area to another location area, e.g. from cell 3 to cell 4 or from one cell group to another cell group. The location area of the mobile station 7 may thus vary in time as the mobile station is free to move from one location (radio coverage area) to another location (to another coverage area) and also within one coverage area. To ensure proper operation of the system and to avoid disconnecting a possibly ongoing connection, handover procedures are provided so that all necessary information will become available for the parties involved (e.g. for the previous and new network controller). The mobile station may also be in communication with more than one base station, e.g. during a so called soft handoff procedure.

In order to be able to control a roaming mobile station that may communicate with different base stations of the mobile telecommunications network the mobile station is registered permanently to a particular home location register (HLR) and temporarily to a visitor location register (VLR). In the example of FIG. 1 the mobile telecommunications network comprises a stand-alone home location register 13. A visitor location register (VLR) 12 is comprised in the MSC 11 part of the UMSC node 10. The mobile station 7 of FIG. 1 within cell 3 is registered both in the HLR 13 of the mobile telecommunications network and in the VLR 11 of the visited location area. It is noted that a mobile telecommunications network may include several home location registers and that instead of being a stand-alone element, the home location register may be included in one of the network controllers. The home and visitor location registers can communicate with each other e.g. over a MAP (Mobile Application Part) interface or any other suitable interface.

The arrangement is typically such that the MS 7 is registered permanently to the HLR 13. The HLR 13 centrally and permanently stores all subscriber information associated with the particular MS 7, including the location area information that is required for enabling the location management of roaming mobile stations. In other words, the HLR 13 keeps centrally track of the location of the mobile station 7 for the location and call routing purposes. The VLR 12 is used for storing information relating to the mobile stations visiting the service area of the MSC associated with the VLR. The visited VLR is capable of providing the HLR with location information concerning the current location of the MS 7 and any possible updates of the location information.

The integrated UMSC node 10 of FIG. 1 comprises a MSC part 11 including a VLR 12 and a SGSN part 20. The UMSC functionality of the node 10 is arranged to perform combined location update procedure (relocation) in a MAP protocol based network. The internal parts of the integrated node 10 are connected by an internal interface, whereby it is possible to optimise of the signalling traffic of the messages between the internal entities of the node 10.

The other elements of the system, including the HLR 13, see and handle the integrated node 10 as a single unit. The integrated node 10 also has a single address. More precisely, the HLR handles the integrated node 10 as the UMSC part.

Therefore the HLR handles all information and messages from or to the integrated node 10 as information and messages from or to the UMSC part, without any knowledge whether the information is associated with the MSC part 11 or the SGSN part 20 of the integrated node.

Figure 2:
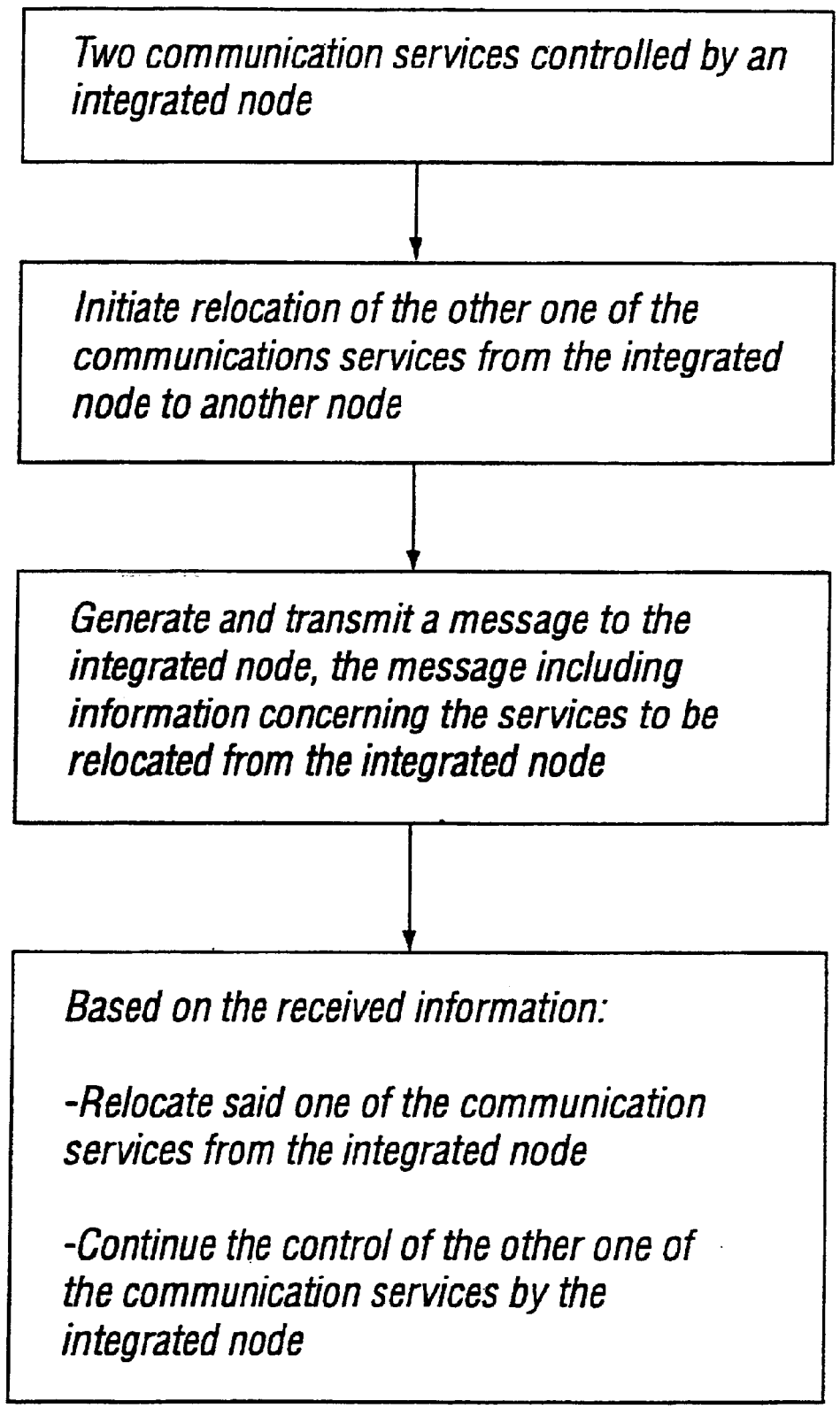
FIG. 2 is a flowchart illustrating the operation of one embodiment of the present invention.
Figure 3:
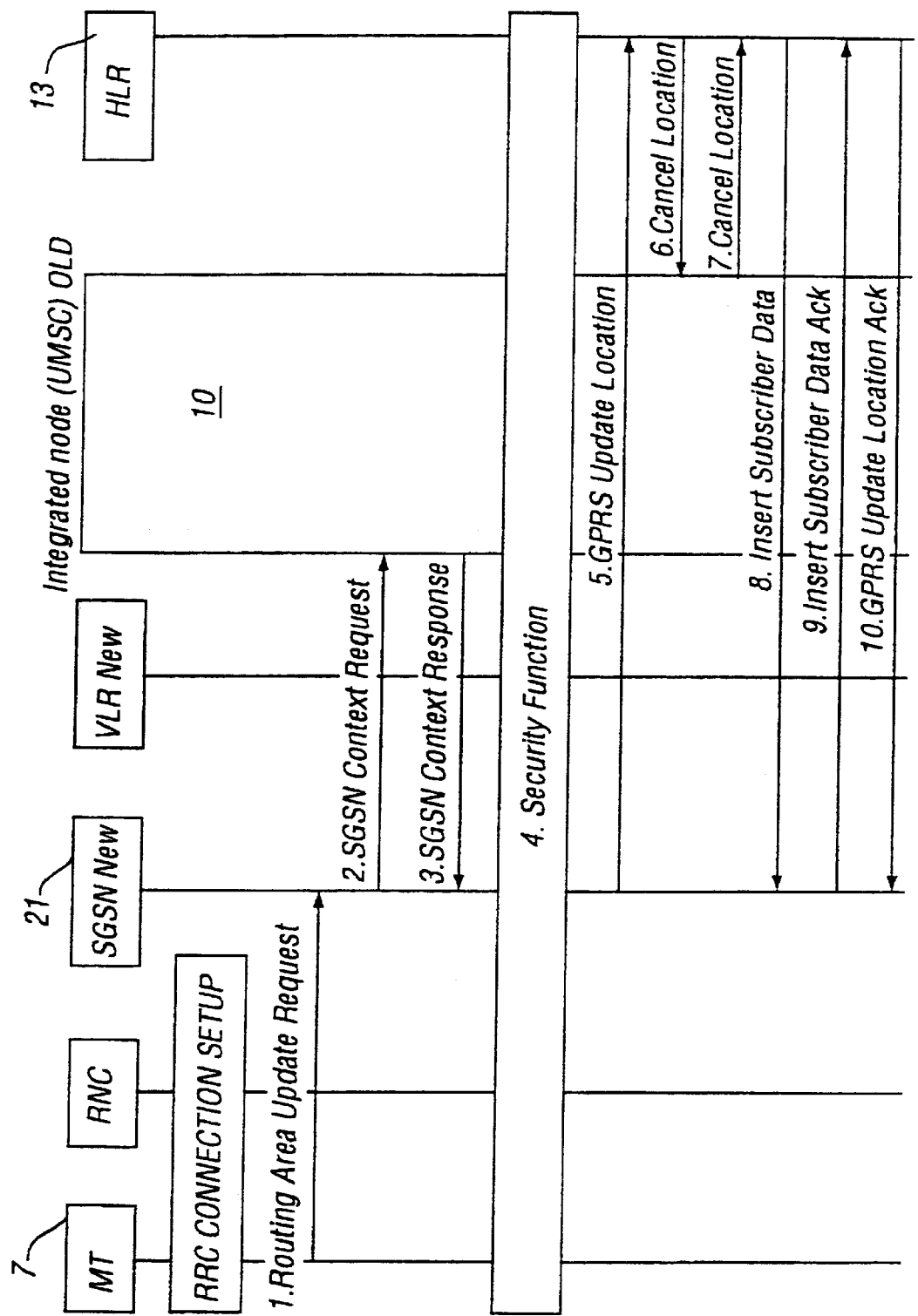
FIG. 3 is an information flow chart in accordance with an embodiment of the present invention.

However, the above described arrangement of the integrated node 10 may also cause a problem when combined location management is used in a communications system providing more than one communication services, such as circuit switched and packet switched services. More precisely, the inventor has found that when a need for relocation of only a part of the communication services arises, a location cancellation message that is sent from the HLR 13 to the integrated node 10 cannot selectively cancel the service or services to be relocated. In FIG. 1 the integrated node 10 does not know whether the circuit switched service or the packet switched service should be cancelled from the node 10, and thus both services will become cancelled. This may not be desired in all instances. For example, it may be that the circuit switched (CS) service will still be provided for the mobile station in FIG. 1 by the cell 3. However, the mobile station 7 may have moved from the PS routing area RA1 into a new PS routing area RA2 beyond the dashed line 19. The new PS routing area is serviced by the base station 9 and overlaps the CS location area LA1 provided by the cell 3. Thus the radio interface for the packet switched services should be handled by the "new" base station 9 and "new" SGSN 21 while the radio interface for the circuit switched service should still be handled by the "old" base station of cell 3 and the "old" controller 10. The following will describe by with reference to all FIGS. 1, 2, and 3, a procedure by means which it is possible to relocate only a part of the connections from the integrated node 10 to the new control node 21 while the remaining parts of the connection will still be handled by the integrated node 10. The numbers in parentheses refer to the numbering of the signalling flow chart of FIG. 3.

When the mobile station 7 moves beyond the dashed line 19 indicating the border line between two PS routing areas RA1 and RA2, wherein the latter is provided by the base station 9, the mobile station 7 sends a 'Routing Area Update Request' (1) message to the new SGSN 21 connected to the base station 9. The message may include information such as and old RAI (Routing Area Identity), old P-TMSI (Packet-Temporarily Mobile Subscriber Identity) signature, and the type of the update. The type of the update information is typically used for indicating a combined LA/RA (Location Area/Routing Area) update. If the mobile station wants to perform an IMSI (International Mobile Subscriber Identity) attach, then the update type is used for indicating a combined LA/RA (Location Area/Routing Area) update together with the IMSI attach. After the new SGSN has received the message (1), it will generate and transmit a 'SGSN Content Request' (2) message to the old SGSN, which in FIG. 1 would be the integrated node 10. The message (2) includes information of the old RAI, old P-TMSI Signature and the address of the new SGSN 21. The new SGSN 21 sends the message (2) in order to receive information such as a MM (Mobility Management) Context and PDP (Packet Data Protocol) context from the old controller entity, i.e. from the integrated node 10. The integrated node 10 sends then an appropriate response (3) providing the new SGSN 21 with the requested information. After this stage some security functions may be executed (4).

The new SGSN 21 sends subsequently a 'GPRS Update Location' (5) message to the HLR 13. The message (5) may include information such as the new SGSN number and address and the IMSI of the mobile station. As response, the HLR 13 generates and sends a 'Cancel Location' (6) message to the integrated node 10. The message (6) may include the IMSI of the mobile station 7, and information concerning the cancellation procedure and the type of the service that is to be cancelled. The latter information defines the connection or service type that is to be cancelled.

According to an embodiment three different alternative indications (if the above discussed two types of communication services are provided for the mobile station) may be included into the message (6) from the HLR: a) delete the packet switched service only, b) delete the circuit switched service only, c) delete both the circuit switched service and the packet switched service. The indications may, naturally, also be opposite, i.e.: a) continue with the packet switched service only, b) continue with the circuit switched service only, c) continue with both the circuit switched service and the packet switched service. In other words, the cancel location message (6) sent from the HLR 13 to the integrated node 10 includes information of the service that is to be cancelled so that the integrated node cancels only those services that are no longer under its location area instead of deletion the whole subscriber. The information may be a clear instruction to cancel a service. The integrated node 10 may also, based on this information, internally make the required decision and cancel those services that it concluded as the ones to be deleted.

The integrated node will then send a 'Cancel Location Ack' (7) message to the HLR 13 to acknowledge the receipt of the instruction to delete one or more of the services previously handled by the old integrated node 10. The HLR will then send an 'Insert Subscriber Data' (8) message to the new SGSN 21. The message (8) may include information such as the IMSI of the mobile station 7 and any relevant GPRS subscription data. The new SGNS 21 acknowledges this by a 'Insert Subscriber Data Ack' (9) message. Finally, the HLR 13 acknowledges the 'GPRS Update Location' (5) message by an acknowledgement message (10).

The embodiment of the present invention has been described in the context of a system employing a packet switched service and a circuit switched service. This invention is also applicable to any other environments, e.g. when two different packet switched services are simultaneously employed. In addition, the need to relocate a communication service may also be caused by another reasons than roaming, e.g. by a failure in the system or by overload. The relocation may also occur to another integrated node instead of a separated or conventional single mode node. In addition, instead of the HLR, the information concerning the communication services and provided to the integrated node may be generated by other network elements as well. According to an alternative the required information is included e.g. in the 'Content Request' (2) message send by the new controller to the integrated node.

It should also be appreciated that whilst embodiments of the present invention have been described in relation to mobile stations, embodiments of the present invention are applicable to any other suitable type of user equipment. It should also be appreciated that base stations can sometimes be referred to as node B (e.g. in the UMTS standard).

It is also noted herein that while the above describes exemplifying embodiments of the invention, there are several variations and modifications which may be made to the disclosed solution without departing from the scope of the present invention as defined in the appended claims.

What is claimed is:

1. A method in a communications system providing communication services for a mobile station, the mobile station being arranged to use at least two different communication services provided by the communications system and the communications system comprising a first network element and a second network element for controlling the communication services provided for the mobile station, wherein the mobile station communicates by using at least two different communication services under the control of the first network element, comprising the subsequent steps of:
    initiating relocation of the control of at least one of said communication services from the first network element to the second network element;
    sending a message to the first network element, said message including information based on which it is possible to selectively relocate said at least one communication service to the second network element; and
    selectively relocating said at least one communication service from the first network element to the second network element based on the information while the first network element continues the control of those communication services that are not selected for relocation.

2. A method according to claim 1, wherein the first network element provides circuit switched communication services and packet switched communication services for the mobile station.

3. A method according to claim 1, wherein the mobile station initiates the relocation by moving from a first area services by the first network element to a second area serviced by the second network element and at least one of the communications services is services by the first network element in both areas.

4. A method according to claim 1, wherein the first network element provides combined location management for the at least two communication services before the relocation is initiated, and, after said at least one communication service is relocated, the first network element provides location management for those communication services only that were not relocated.

5. A method according to claim 1, wherein the message is generated and sent to the first network element by a location register of the communication system, the location register being arranged to store location area information concerning the mobile station.

6. A method according to claim 5, wherein the interface between the location register and the first network element is based on a mobile application part protocol.

7. A method according to claim 1, wherein the first network element comprises an integrated switching center providing control functionality for at least two different communication services.

8. A method according to claim 7, wherein the integrated switching center comprises a mobile switching center functionality for circuit switched communication services and a serving general packet radio service support node for packet switched communications services.

9. A communication system for providing communication services for a mobile station, the communications system providing the mobile station with at least two different communication services, the communications system comprising:
    a first network element for controlling the at least two communication services provided for the mobile station for communication;
    means for initiating relocation of the control of at least one of said communication services from the first network element to a second network element; and
    means for sending a message to the first network element, said message including information based on which it is possible to selectively relocate said at least one communication service to the second network element, wherein the first network element is arranged to selectively cancel its control of the communication services based on the information and to continue the control of those communication services that are not selected for relocation.

10. A communications system according to claim 9, wherein the first network element is arranged to provide circuit switched communication services and packet switched communication services for the mobile station.

11. A communications system according to claim 9, wherein the service areas of the network elements of said at least two communication services are different from each other.

12. A communications system according to claim 9, wherein the arrangement is such that the first network element provides combined location management for the at least two communication services before the relocation is initiated, and, subsequent to relocation of at least one communication service, the first network element provides location management for those communication services only that were not relocated.

13. A communications system according to claim 9, comprising a location register that is arranged to store location area information concerning the mobile station and to generate and transmit the message to the first network element.

14. A communications system according to claim 13, wherein the second network element is arranged to communicate with the location register.

15. A communications system according to claim 13, wherein the interface between the location register and the first and/or second network element is based on a mobile application part protocol.

16. A communications system according to claim 9, wherein the first network element comprises an integrated mobile switching center.

17. An integrated node in a communications system for providing a mobile station with at least two different communication services, comprising:
    means for controlling a first communication service provided for the mobile station for communication; and
    means for processing a message from the communication system, said message including information based on which it is possible to selectively relocate one or several of the communication services to a second network element, wherein the intergrated node is arranged to selectively cancel its control of the communication services to be relocated based on the information and to continue the control of those communication services that are not selected for relocation.

* * * * *

UNITED STATES PATENT AND TRADEMARK OFFICE
CERTIFICATE OF CORRECTION

PATENT NO. : 6,804,533 B1
DATED : October 12, 2004
INVENTOR(S) : Makinen

It is certified that error appears in the above-identified patent and that said Letters Patent is hereby corrected as shown below:

Title page,
Item [57], ABSTRACT,
Line 6, please delete the word "provides" and replace with -- provided --.

Column 9,
Lines 40 and 42, please delete the word "services" and replace with -- serviced --.

Column 10,
Line 1, please delete the word "communication" and replace with -- communications --.
Line 56, please insert -- Means For Controlling A Second Communication Service Provided For The Mobile Station For Communication; and --.

Signed and Sealed this

Twenty-eighth Day of December, 2004

JON W. DUDAS
*Director of the United States Patent and Trademark Office*